Patented May 13, 1930

1,758,009

UNITED STATES PATENT OFFICE

WILLIAM J. O'BRIEN, OF BALTIMORE, MARYLAND

PROCESS OF MAKING BLEACHED WHITE BARYTES

No Drawing.   Application filed May 28, 1927.   Serial No. 195,147.

This invention relates to a process of treating barytes ore in order to produce a bleached white product.

The best grades of commercial bleached barytes, manufactured by the methods heretofore employed, have been found objectionable owing to the fact that they do not possess the highly desirable pure white color and have in general a pinkish or yellowish tint. Furthermore, extreme care must be exercised in the prior methods of manufacture in order that the texture of the barytes will approach the fineness desired.

Among the objects of this invention is the production of a bleached barytes that is extremely white in color and possesses a very fine texture. A further object of this invention is the manufacture of barytes possessing these properties by a process which is efficient, cheap, and readily practiced.

Other, further and more specific objects of this invention will become readily apparent to persons skilled in the art from a consideration of the following description.

A specific example of carrying out my process is as follows. The crude barytes ore is washed, dried, and then dry-ground so as to pass 200 mesh, or preferably to a finer state. This ground ore is intimately mixed with niter cake ($NaHSO_4$) and then melted in a suitable furnace, preferably by passing thru a continuous rotary kiln. The mixture in passing thru the kiln is brought in direct contact with a flame moving in a counter direction which serves to melt the mass. An oxidizing atmosphere is maintained in the kiln during this roasting operation and any organic matter that may be present is burned out.

The action of the niter cake in the molten state is to dissolve the iron compounds and other soluble impurities. It appears that part of the barytes is also dissolved by the molten niter cake.

Where the raw barytes ore or mixture of barytes ore and niter cake contains a large quantity of organic matter, I have found it advantageous to add small amounts (for example, 1 to 10% by weight of the niter cake) of a suitable oxidizing agent, such as $NaNO_3$, $NaClO_3$, $KClO_3$, etc., which serves to remove the last traces of organic matter. This oxidizing agent is added to the mixture before calcination.

The molten mass is drawn from the hot end of the kiln and introduced into water, where the mass becomes disintegrated and is then suspended in the water. This disintegration occurs when the molten mass passes into the water, and the barytes precipitates out as $BaSO_4$ while the soluble matter, including sulphate of iron, is dissolved by the water. The sulphate of iron is present chiefly as ferric sulphate, and it may be eliminated entirely from the precipitated $BaSO_4$ by the addition to the water of a suitable reducing agent, such as $SO_2$ gas or $Na_2SO_3$ which converts the ferric sulphate to the more soluble ferrous sulphate. The precipitated barytes is then water washed free from ferrous sulphate and other soluble impurities, filter-pressed, dried and dry-ground.

The resulting product is a high grade of barytes, possessing a pronounced white color and fine texture.

The ratio of barytes ore to niter cake may vary from one part of barytes to one part niter cake up to as much as ten parts barytes to one part of niter cake.

I have found it advantageous under certain conditions to substitute NaCl for a portion of the niter cake. The addition of NaCl to the mass forms HCl, which tends to react very readily with any iron present in the barytes and forms $FeCl_3$, which is highly soluble. The substitution of NaCl may be from 5 to 50% of the quantity of niter cake employed. Since the addition of NaCl raises the fusion point of the mixture, it is desirable to avoid excessive quantities of NaCl.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of treating barytes, melting a mixture of ground barytes ore, niter cake and sodium chloride by means of a direct flame and in an oxidizing atmosphere, introducing the fusion product into water, reducing any ferric salt in the resulting mass to the ferrous state and then washing the barium sulphate.

2. In a process of treating barytes, roasting an intimate mixture of barytes ore, niter cake, and sodium chloride by means of a direct flame and in an oxidizing atmosphere until a uniform molten mass is obtained and any organic matter present in the mixture is burned, introducing the molten mass into water, reducing any ferric salt in the resulting mass to the ferrous state and then washing out the soluble impurities from the barium sulphate.

3. In a process of treating barytes, roasting a mixture of ground barytes ore, niter cake, sodium chloride, and an oxidizing salt of an alkali metal until a uniform molten mass is obtained and any organic matter present in the mixture is burned, introducing the fusion product into water, reducing any ferric salt in the resulting mass to the ferrous state and then washing the barium sulphate.

4. In a process of treating barytes, roasting an intimate mixture of ground barytes ore, niter cake, sodium chloride and an oxidizing salt of an alkali metal by means of a direct flame and in an oxidizing atmosphere until a uniform molten mass is obtained and any organic matter present in the mixture is burned, introducing the molten mass into water, reducing any ferric salt in the resulting mass to the ferrous state and then washing out all soluble impurities from the barium sulphate.

In testimony whereof I affix my signature.

WILLIAM J. O'BRIEN.